United States Patent
Bright et al.

[11] Patent Number: 5,837,299
[45] Date of Patent: Nov. 17, 1998

[54] VARIABLE DIMENSION COOLING CHAMBER

[75] Inventors: Timothy L. Bright, Greenville; Stephen A. Bright, Troy; Terry A. Shroder, Arcanum; Daniel A. Hartman, Cincinnati, all of Ohio

[73] Assignee: Electra Form, Inc., Vandalia, Ohio

[21] Appl. No.: 629,781

[22] Filed: Apr. 9, 1996

Related U.S. Application Data

[63] Continuation-in-part of Ser. No. 359,037, Dec. 19, 1994.

[51] Int. Cl.$^6$ .................................................. B29C 49/64
[52] U.S. Cl. .......................................... 425/526; 425/547
[58] Field of Search ...................................... 425/526, 547

[56] References Cited

U.S. PATENT DOCUMENTS

| | | | |
|---|---|---|---|
| Re. 33,237 | 6/1990 | Delfer, III | 425/547 |
| 4,140,464 | 2/1979 | Spurr et al. | 425/533 |
| 4,177,238 | 12/1979 | Allen | 264/328 |
| 4,690,633 | 9/1987 | Schad et al. | 425/526 |
| 4,721,452 | 1/1988 | Delfer, III | 425/547 |
| 4,786,455 | 11/1988 | Krishnakumar et al. | 264/237 |
| 5,338,172 | 8/1994 | Williamson et al. | 425/143 |
| 5,447,426 | 9/1995 | Gessner et al. | 425/534 |
| 5,501,593 | 3/1996 | Marcus | 425/547 |

OTHER PUBLICATIONS

Santoprene® Thermoplastic Rubber, General Product Bulletin, TPE–02–11 by Advanced Elastomer Systems.
Advanced Elastomer Systems Technical Correspondence dated Dec. 1, 1994.
General Polymers Materials Data Sheet Santoprene 111–45 by Advanced Elastomer Systems.
Advanced Elastomer Systems Material Safety Data Sheet, Nov. 1, 1995.

*Primary Examiner*—Thomas R. Weber
*Attorney, Agent, or Firm*—Locke Reynolds

[57] ABSTRACT

A cooling assembly includes a base and at least one body having at least one opening, each opening including an inner surface. An insert is situated within each opening, each insert having an inner surface and an outer surface. The outer surface of each insert confronts a corresponding body inner surface to define a volume. At least one connection is provided between the volume and a source of fluid coolant for filling the volume with the fluid coolant. The insert includes at least one surface which moves to conform at least in part to the outer surface of a molded article whereby heat transfer occurs between the molded article and the fluid coolant across the insert.

36 Claims, 8 Drawing Sheets

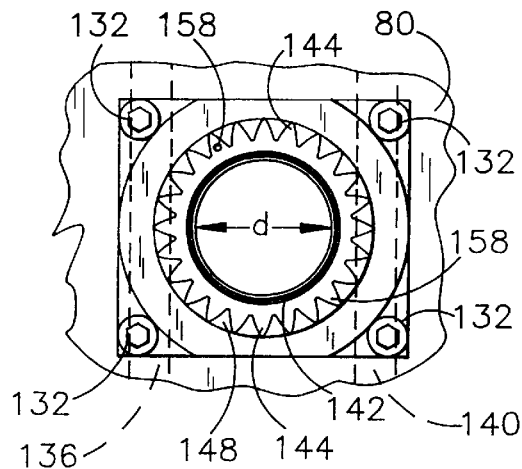
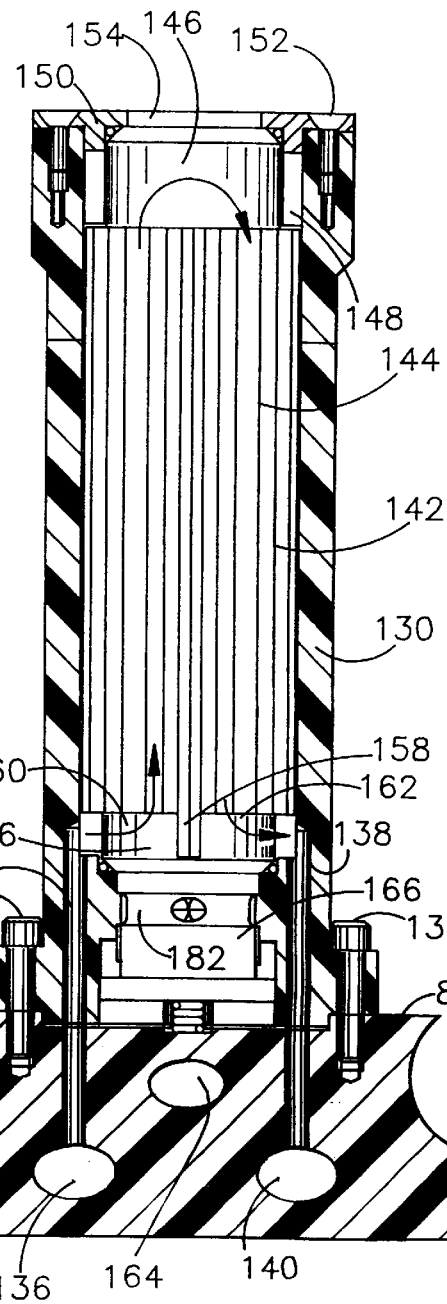
FIG. 7
FIG. 6

VARIABLE DIMENSION COOLING CHAMBER

CROSS-REFERENCE TO RELATED APPLICATIONS

The present application is a continuation-in-part of U.S. application Ser. No. 08/359,037 filed Dec. 19, 1994, now pending.

BACKGROUND OF THE INVENTION

The present invention relates generality to the art of cooling articles following injection molding, and particularly to the art of cooling sets of plastic articles prior to subsequent handling and/or processing. The apparatus has particular utility in the cooling of preforms intended for use in the manufacture of plastic bottles.

In the manufacture of plastic articles in injection molding machines, an enhanced production rate is often achieved by simultaneously molding in a single machine a large number of the articles. The rate of production can be measured by the number of articles manufactured by each cycle of the machine divided by the time for each cycle. A number of factors impact on the production rate such as the capacity of the molding machine to plasticize the amount of plastic resin to the appropriate fluid state to permit formation by injection of the number of articles intended during each cycle of the machine.

An important limiting factor is the time required to cool the articles once formed in the molding machine of the plasticized or molten resin. The resin forming the articles must cool from the injection temperature, which is typically several hundred degrees Celsius, down to a temperature at which the articles will remain stable in form as they are handled in subsequent processes, which is generally a temperature less than 100° C. Of course, the exact temperatures are a function of the particular resin employed and well understood by those experienced in the art of injection molding.

The cooling time is a function of the amount of resin employed in the articles and in the thickness of the articles. As the thickness of the articles increases, the thermal conductivity of the plastic, which is generally poor, inhibits the flow of heat from interior portions of the article thus extending this cooling time. It has been recognized that the articles need not be fully cooled while in the injection molding machine so long as the outside surface of the articles is cooled sufficiently to permit withdrawal of the article from the molding machine without distortion and so long as some additional cooling is accomplished by a separate cooling apparatus.

The combination of cooling apparatus with article removal apparatus has been previously employed particularly in connection with the manufacture of preforms used in the formation of molecularly oriented plastic bottles. The cooling apparatus can be employed to cool the preforms down to a storage temperature after which the preforms can be reheated for blow molding at some later time. Alternatively, the preforms may be cooled down to an appropriate temperature for blow molding and transferred directly to a blow molding operation. Due to the difference in the molding temperature as compared to storage temperature that the time required for cooling is different, but that both cooling functions can be accomplished by employing appropriate apparatus outside of the injection molding machine itself.

Examples of such prior art apparatus are to be found in U.S. Pat. Nos. 4,140,464; 4,690,633; 4,721,452; 4,786,455; and, 5,338,172. Certain of these patents and other prior art recognize that the length of time employed in cooling is generally longer than the length of time employed during the injection cycle itself. As a result, such apparatus has generally adopted a greater number of cooling areas than molding areas. Generally, means are provided to shift the articles from the molding area to one of the cooling areas in an organized fashion so the cooling time is maximized and, at the same time, the article production is also maximized. In some prior art devices, the cooling is not initiated until the article is fully removed from the molding machine, but such a delay in cooling allows some opportunity for unwanted deflection of the articles. Thus, some prior art devices have employed cooling directly on the apparatus which removes the articles from the molding machine. While such cooling during removal of the article from the machine is desirable, the overall speed of operation of the molding machine can be maximized by having the article removing apparatus have as little inertia as possible so that speedy extraction of molded articles can be achieved. It is also desirable for the article removing and cooling apparatus be as simple to construct and operate as possible consistent with the overall objectives of the apparatus.

In some prior art apparatus, cooling of molded plastic articles has been achieved through intimate contact between the molded article and al passing flow of a chilled fluid such as a gas. Examples of such apparatus are to be found in U.S. Pat. Nos. 4,786,455 and 5,338,172. In such apparatus, the chilled fluid often has significant thermal or other impact or influence on adjacent portions of the apparatus as well as the surrounding environment and does not simply impact the thermal character of the molded article.

In other prior art apparatus, cooling of molded plastic articles has been achieved through direct contact, or very close proximity, between the molded article and a cooled surface having a conformation closely resembling the molded article. Examples of such apparatus are to be found in U.S. Pat. Nos. 4,690,633, 5,447,426 and Re. 33,237. The close dimensional requirements of such apparatus can lead to unwanted performance problems which result from even very small alignment problems or dimensional changes in the molded article.

Accordingly it is desirable to achieve the desired cooling of molded plastic articles through direct contact, or very close proximity, between the molded article and a cooled surface having a conformation closely resembling the molded article but capable of some conformational change in response to changes or variations in the molded article.

SUMMARY OF THE INVENTION

In accordance with these desirable attributes, the present invention comprises cooling apparatus which is intended for use generally with an injection molding machine employed to mold sets of articles in molding cavities. The molding cavities are defined by at least two molding elements which are movable between a closed confirmation, wherein the articles are actually molded, and an opened or spaced confirmation, where the articles are released into a space between the molding elements. The cooling apparatus of the present invention includes a base which can be coupled to the injection molding machine to permit accurate coordination of actuation of the apparatus and the molding machine.

In one embodiment, the base of the cooling apparatus is mounted to an arm for movement with respect to the injection molding machine in and out of the space between the molding elements. The cooling apparatus engages the molded articles as they are released from the molding elements of the molding machine and initiates cooling of the articles as they are removed from the injection molding machine. In another embodiment, the base of the cooling apparatus is situated adjacent to the injection molding machine, and a molded article engagement apparatus is coupled to the arm for movement with respect to the injection molding machine in and out of the space between the molding elements to engage the molded articles as they are released from the molding machine and convey them to the cooling apparatus situated adjacent to the injection molding machine.

In either embodiment, the cooling assembly generally comprises the base and at least one body having at least one opening fixed to the base, each opening including an inner surface. An insert is situated within each opening, each insert having an inner surface and an outer surface. The outer surface of each insert confronts a corresponding body inner surface to define a volume. At least one connection is provided between the volume and a source of fluid coolant for filling the volume with the fluid coolant. The insert includes at least one surface which moves to conform at least in part to the outer surface of a molded article whereby heat transfer occurs between the molded article and the fluid coolant across the insert.

In one embodiment, the cooling assembly generally comprises the base and at least one body preferably in the form of a sleeve having an opening fixed to the base, the opening including an inner surface. An insert is situated within the sleeve, the insert having an interior surface generally matching the molded plastic articles and an outer surface defining a fluid coolant path. A spool is movably situated within the sleeve and is responsive to contact by a surface of the molded article so that the spool moves to a position conforming to the length of the molded article. A biasing element biases the spool toward contact with the molded article.

In another embodiment, the cooling assembly generally comprises the base and at least one body having at least one opening fixed to the base, each opening including an inner surface. An elastic insert is situated within each opening, each elastic insert having an inner surface and an outer surface. The outer surface of each elastic insert confronts a corresponding body inner surface to define a volume. At least one connection is provided between the volume and a source of fluid coolant for filling the volume with the fluid coolant. The elastic insert is responsive to changes in pressure in the fluid coolant so that the elastic insert inner surface can conform to the outer surface of a molded article whereby heat transfer occurs between the molded article and the fluid coolant across the elastic insert.

One feature of the present invention is that in both embodiments, the cooling assembly is coupled to a source of vacuum for insuring engagement between the molded article and the cooling assembly.

In one embodiment, the vacuum is controlled by the spool which is movably situated within the sleeve so that upon contact by a surface of the molded article the spool moves to a position enhancing the vacuum applied to the article thereby insuring a positive conforming engagement between the article and the cooling assembly. A biasing element biases the spool toward a position so the vacuum access is restricted in the absence of the molded article thereby conserving the amount of energy required to create the vacuum.

In another embodiment, the vacuum is coupled to the interior of the elastic insert at an axial lowermost point.

Upon entry of a molded article, the vacuum assists in conforming at least a lower portion of the elastic insert to the article thereby enhancing the heat transfer across the elastic insert to the coolant.

Another feature of the present invention is that in both embodiments, the body, or sleeve, is preferably made of an low heat transfer material to provide an enhanced economical operation by insulating the coolant for the general environment while focusing the coolant toward the insert and plastic article sought to be cooled.

Other features and advantages of the present invention will become apparent to those skilled in the art upon consideration of the following description of a preferred embodiment. The description refers to the accompanying drawings which illustrate the best mode of the invention as presently perceived.

BRIEF DESCRIPTION OF THE DRAWINGS

FIG. 6 is a partial sectional view showing a second embodiment of a cooling assembly in accordance with the present invention with the cooling insert shown in elevation.

FIG. 7 is an elevation view of the cooling assembly shown in FIG. 6 with the collar removed.

DESCRIPTION OF A PREFERRED EMBODIMENT

Figure 1:
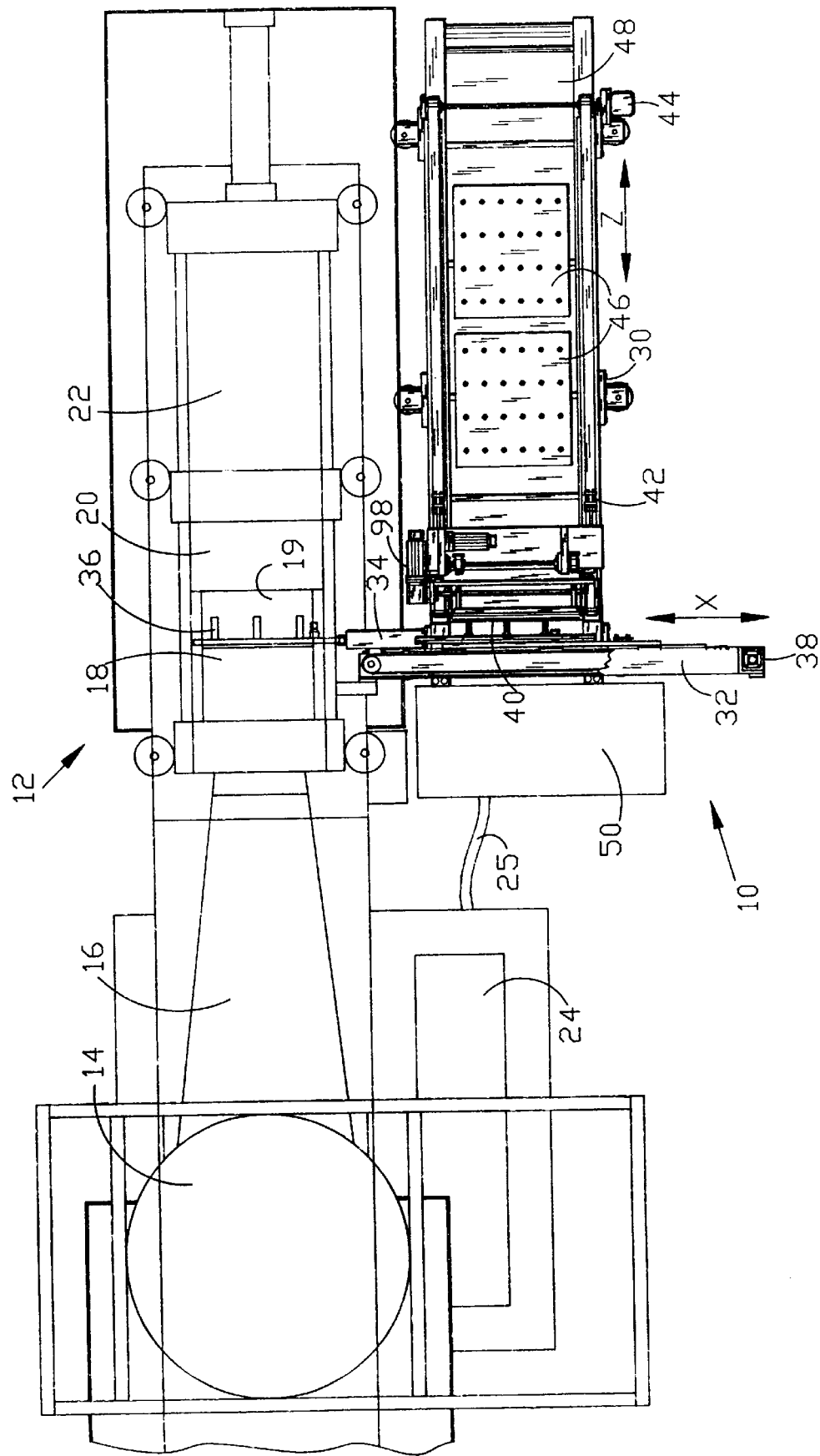
FIG. 1 is a plan view of a take-out and cooling apparatus coupled to an adjacent injection molding machine producing articles to be handled by the take-out and cooling apparatus.

A take-out and cooling apparatus 10 in which the present invention is illustratively employed is shown in FIG. 1 coupled to an injection molding machine 12. The molding machine 12 includes a source of resin 14 which feeds one or more plasticizer injection units 16 which plasticizes the resin until the resin acquires the appropriate temperature and fluid conditions to permit injection. A first mold element 18 is coupled to the plasticizer injection unit 16. A second mold element 20 is coupled to a ram or other mold closing and opening unit 22 which moves mold element 20 from the illustrated open position where mold element 20 is spaced from mold element 18 to a closed position (not illustrated) where mold elements 18 and 20 are contiguous. In the closed position, a plurality of spaces or cavities are defined between mold elements 18 and 20 which receive the molten resin from the plasticizer injection unit 16 to form molded articles. The general operation of the injection molding machine 12 is controlled by a control unit 24 in the conventional manner.

The take-out and cooling apparatus 10 includes a base 30 and arm 32 is fixed to the base 30 and is coupled to the molding machine 12 so that the molding machine 12 and take-out and cooling apparatus 10 are at a pre-set location with respect to each other. A carriage 34 is mounted for movement on arm 32 in the dimension X. The carriage 34 carries a frame unit, including molded article engagement apparatus 36, which moves into and out of the space 19 between the molding elements 18 and 20 when the mold elements are in the illustrated open confirmation. The article engagement apparatus 36 preferably has the form of a plurality of article holders 28 including cooling chambers which engage the articles molded by the molding machine 12 as they are released from the molding elements 18 and 20. A motor 38 coupled to arm 32 and to carriage 34 moves the carriage and end of arm article engagement apparatus into and out of space 19.

As the carriage 34 and article engagement apparatus exit space 19, the motor 38 moves the article engagement apparatus 36 to one of a pre-selected plurality of positions located in confronting relationship to a transfer assembly 40 coupled to a gantry 42 which is movable with respect to base 30 by means of motor 44. The molded articles are grabbed from the article engagement apparatus 36 by the transfer assembly 40 and moved in the dimension Z to one of several cooling stations 46. The cooling stations each comprise a multiplicity of cooling cavities which receive the molded articles where the articles remain for a programmed cooling time.

As a general rule, the cooling time significantly exceeds the time required for molding the articles in the injection molding machine 12 and, as a result, the number of positions and the cooling stations 46 for receiving articles for cooling far exceeds the number of articles actually molded in each cycle of the molding machine. After the articles have been fully cooled to the desired temperature, the transfer assembly 40 removes a set of the articles from the cooling station 46 and deposits them on moving belt 48 where they are transported for processing. The coordination of the operation of the take-out and cooling apparatus 10 and the injection molding apparatus 12 is achieved by a control unit 50 for the take-out and cooling apparatus 10. The control unit 50 is coupled to control unit 24 of the molding machine 12 by appropriate cabling 25. Additional details of the cooling assemblies employed in the take-out and cooling apparatus 10 will be revealed from a review of FIGS. 2–9.

The article engagement apparatus 36 preferably comprises a cooling assembly having similar construction to the cooling stations 46 to minimize the spare parts inventory. On the article engagement apparatus 36, each article holder 28 is separated from the next adjacent article holder by a center-to-center distance defined by the spacing between the cavities defined by the mold pair 18, 20. In order that the carriage 34 and article engaging apparatus 36 have a low inertia, they are desirably made of a lightweight material such as 6061-T6 aluminum. A superior performance of the carriage 34 and article engaging apparatus 36 can be achieved by forming large portions of the apparatus from an acetal copolymer engineering plastic such as ACETRON GP™ manufactured by Polymer Corporation, Reading, Pa., or an equivalent engineering grade plastic having a thermal conductivity of less than about $6 \times 10^{-4}$ cal. cm./sec. cm.$^2$ ° C. In the cooling stations 46, the separation between the individual cooling chambers in the X dimension is a fraction of the separation between the article holders 28 on the article engagement apparatus 36 and is equal to the spacing of the article grabbers on transfer assembly 40.

In a first embodiment, shown in FIGS. 2–5, each of the individual article receivers 28 of either the article engaging apparatus 36 and/or the cooling stations 46 comprises a base or frame 80 which includes a coolant supply channel 56 and a coolant drain channel 58. The rate of flow and the pressure of the water or other fluid coolant 57 in the channels 56 and 58 is controlled by control unit 50. The frame 80 also includes a vacuum channel 54 which is coupled to a source of vacuum 90 controlled by control unit 50.

Figure 3:
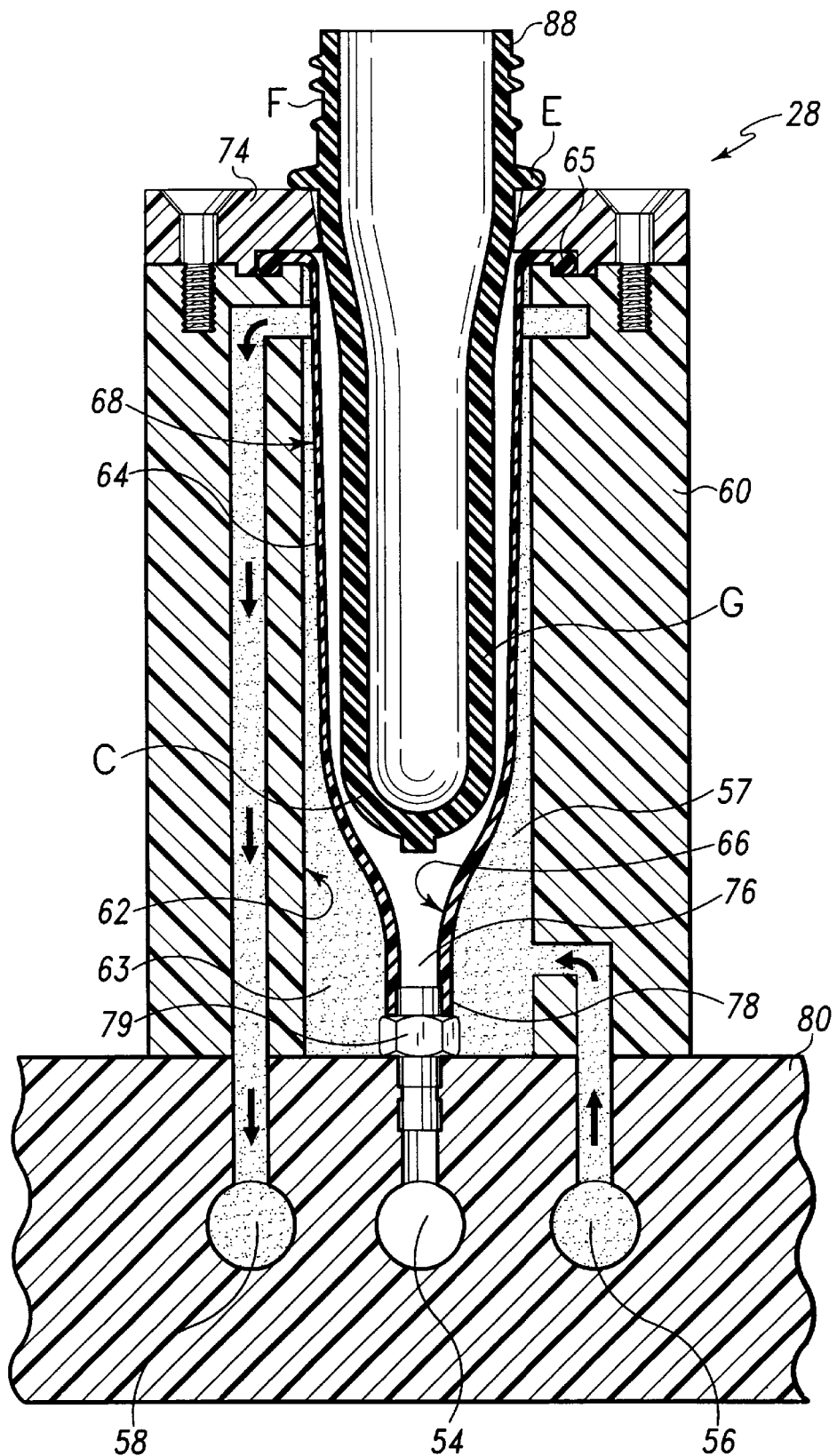
FIG. 3 is a sectional view similar to FIG. 2 showing the first embodiment of the cooling assembly with a molded article situated therein but not in thermal contact with the insert due to a reduced pressure in the cooling medium.
Figure 4:
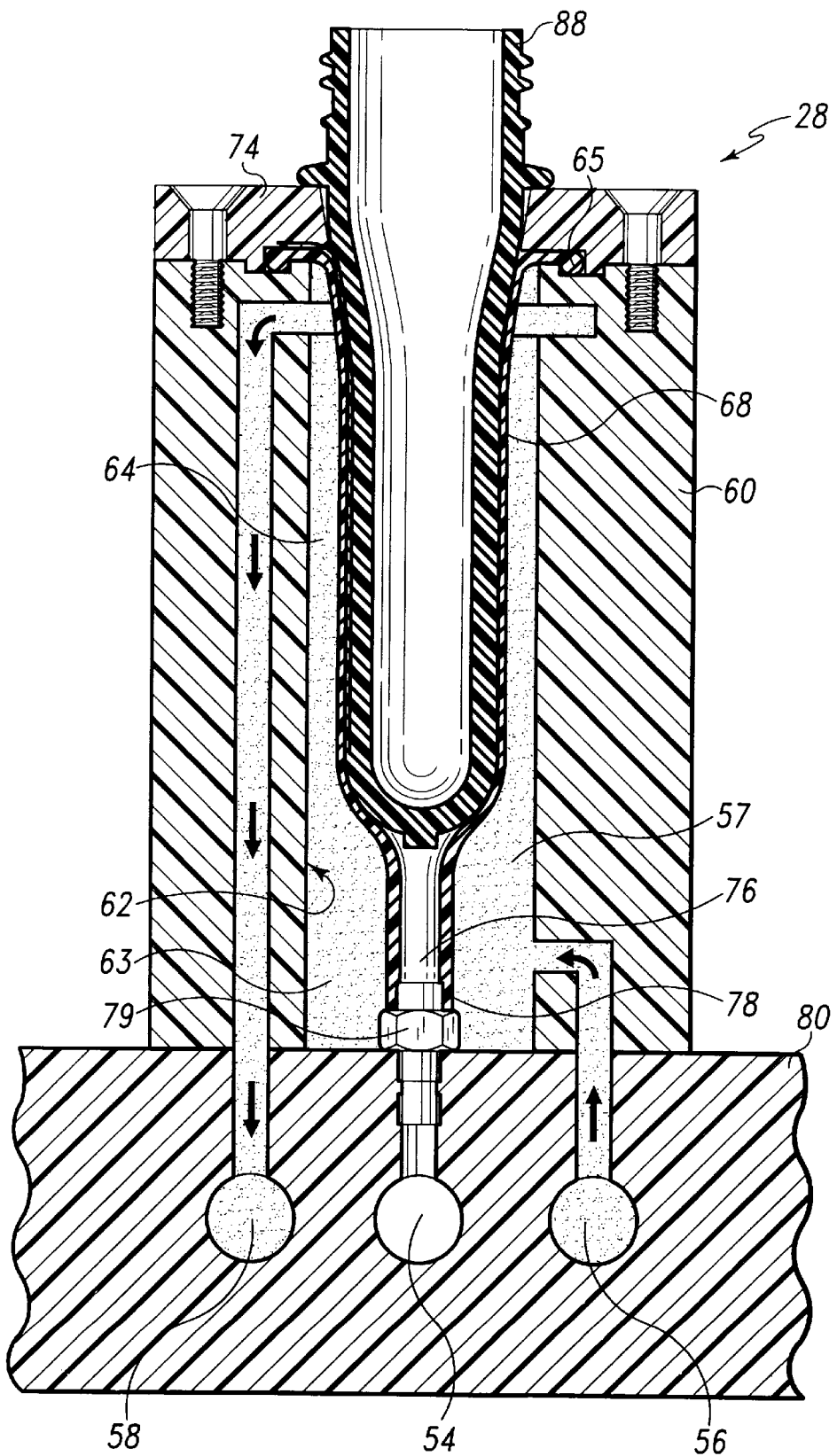
FIG. 4 is a sectional view similar to FIGS. 2 and 3 showing the first embodiment of the cooling assembly with a molded article situated therein in thermal contact with the insert and cooling medium surrounding the insert.

A body or sleeve 60 having an inner surface 62 is fixed to the base 80. An elastic insert 64 is situated within the sleeve 60. The elastic insert 64 has an inner surface 66 and an outer surface 68. The outer surface 68 and confronting sleeve inner surface 62 define a volume 63 filled by the water or other fluid coolant 57 which enters through lower passageway 70 and leaves through upper passageway 72. The elastic insert 64 includes an upper margin 65 which is retained by an end cap 74 fixed to the sleeve 60. The end cap 74 includes an opening 76 having a shape and size permitting insertion of the molded article 88 within the elastic sleeve as shown in FIG. 3. The elastic insert 64 also includes an opening 76 at an axial lowermost point 78 which is coupled to the source of vacuum 90 through bushing 79.

Figure 2:
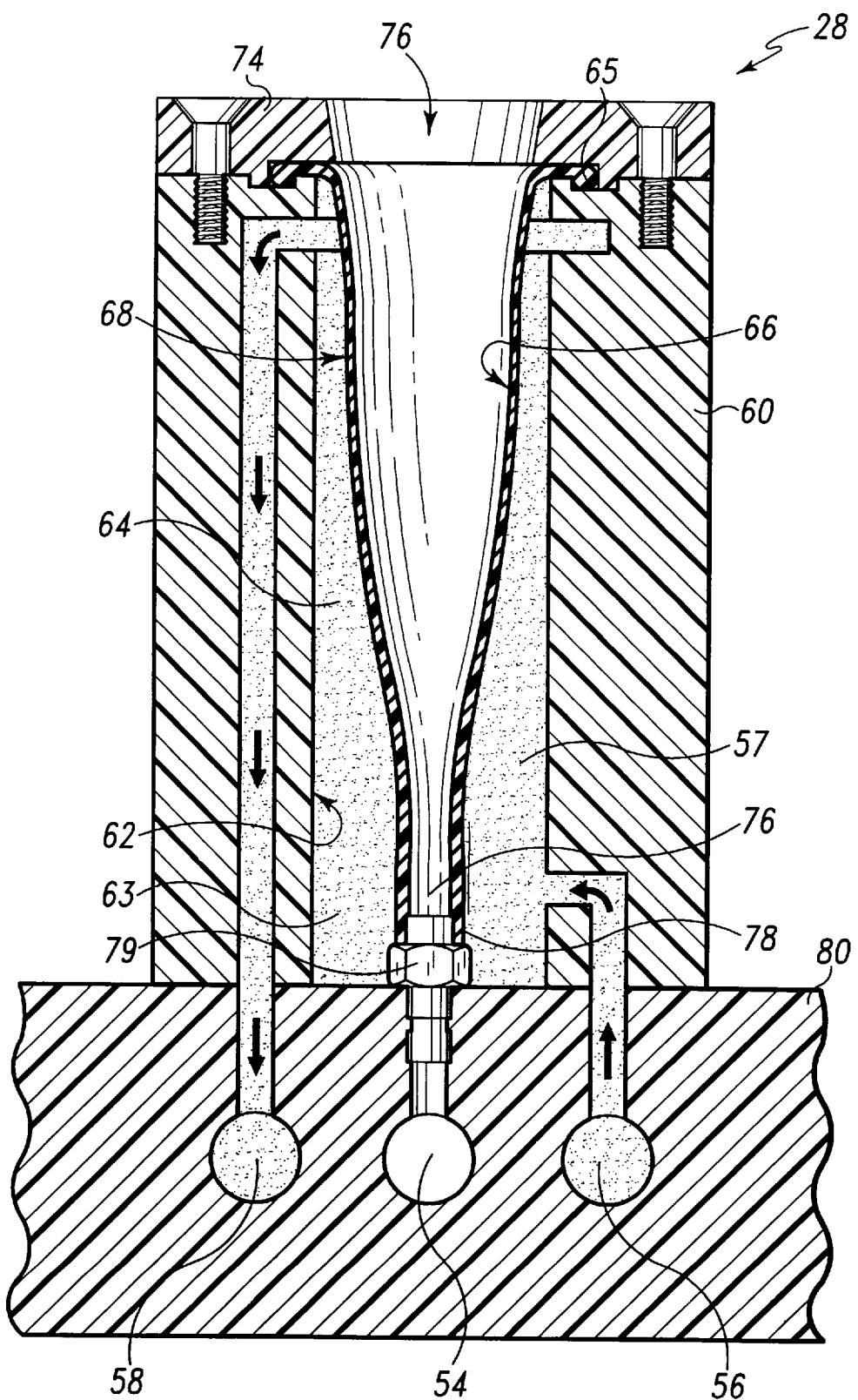
FIG. 2 is a sectional view showing a first embodiment of a cooling assembly in accordance with the present invention which forms an element of the take-out and cooling apparatus.

The elastic insert 64 is dimensionally responsive to changes in pressure in the fluid coolant 57 relative to ambient air pressure. The elastic insert 64 is shown in FIG. 2 at or near a balanced pressure situation between the fluid coolant 57 and the surrounding atmosphere. When the pressure in the fluid coolant 57 is lowered, the elastic insert 64 expands outward, as shown in FIG. 3, which permits the insertion or withdrawal of a molded article such as preform 88. When the pressure in the fluid coolant 57 is again raised, the elastic insert inner surface 66 is conformed to the molded article outer surface to maximize heat transfer between the molded article 88 and the fluid coolant 57 across the elastic insert 64.

The elastic insert 64 preferably has a thermal conductivity greater than the sleeve 60 to localize the cooling effects of the assembly to the interior of the insert. This can be accomplished, for example, by injection molding the sleeve 60 of an engineering grade acetal copolymer having a thermal conductivity of less than about $6 \times 10^{-4}$ cal. cm./sec. cm.$^2$ ° C. such as ACETRON GP™ while injection molding the elastic insert 64 of an elastomer such as a polysiloxane thermoset elastomer or a copolyester-ether thermoplastic elastomer having a thermal conductivity of more than about $6 \times 10^{-4}$ cal. cm./sec. cm.$^2$ ° C. The preferred thermal character will be enhanced by making the wall thickness of the elastic insert 64 as thin as mechanically possible consistent with the use to which the insert will be subjected. In the preferred embodiment, the elastic insert 64 has a wall thickness of between about 0.5 to 2.5 mm. and is constructed of Santoprene® 111-45, a proprietary thermoplastic rubber available from Advanced Elastomer Systems, L.P. of Akron, Ohio, U.S.A., having a thermal conductivity of about $40 \times 10^{-4}$ cal. cm./sec. cm.$^2$ ° C.

Figure 5:
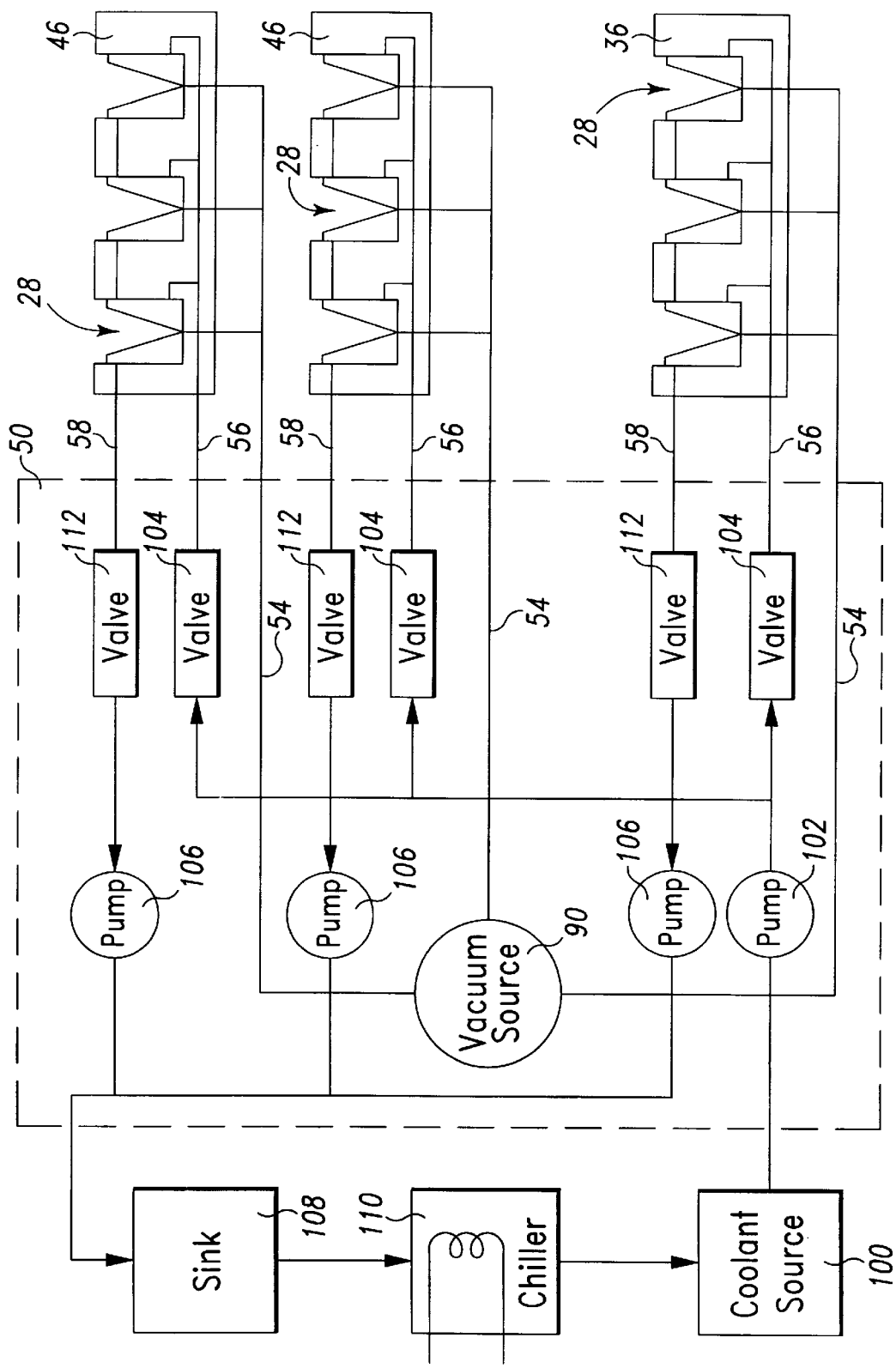
FIG. 5 is a schematic view of apparatus for controlling the flow and pressure in the cooling medium to permit the first embodiment of the cooling assembly to operate.

The cooling apparatus and the control unit 50 is in part schematically shown in FIG. 5 to include a chilled coolant source 100. A first pump 102 controls the input pressure of the coolant from the source 100 into the coolant supply channels 56. Input control valves 104 separately control the rate of flow of coolant into each of the supply channels 56. A second pump 106 is situated in each drain channel 58 which pumps coolant away from the article receivers 28 toward sink 108. The coolant is preferably cycled through chiller 110 to coolant source 100. The second pumps are preferably operated at a constant rate about equal to the first pump 102 so that the outflow of coolant is at a generally constant rate with only a small positive pressure being maintained in each channel 58. The pressure within each channel 58 can then be reduced by at least partially closing the input control valve 104 while maintaining a constant pumping rate on the second pumps 106, and can be increased by opening the input control valve 104 wider than its initial setting. Alternatively, the second pumps can be operated at a constant rate significantly above that of the first pump 102 so that the outflow of coolant is at a generally constant rate with only a small negative pressure being maintained in each channel 58 The pressure within each channel 58 can then be increased by at least partially closing the output control valve 112 while maintaining a constant pumping rate on the second pumps 106, and can be increased by closing the output control valve 112 thus throttling the outward flow of coolant through pumps 106. Other combinations of pumps and control valves will be apparent to those skilled in the art which will function in a similar way to achieve substantially the same result.

In a second embodiment, shown in FIGS. 6–9, each of the individual article receivers 28 of either the article engaging apparatus 36 and/or the cooling stations 46 comprises a sleeve 130 fixed by bolts 132 to a frame 80 or other equivalent support. The sleeve 130 which is preferably made of ACETRON GP™ includes a water inlet channel 134 coupled to a water supply channel 136 within frame 80. The sleeve 130 also includes a water drain channel 138 coupled to channel 140 within frame 80. The channels 136 and 140 are coupled through coupling 82 to a remote supply of chilled water which is introduced into channel 136 and withdrawn from channel 140. Within sleeve 130 is an insert 142 preferably made of 6061-T6 aluminum or other material having a high thermal conductivity. The insert 142 includes in a middle portion a plurality of radiating fins 144. An upper end 146 of the insert is of reduced diameter to define an annular space 148 between the insert 142 and the sleeve 130. The annular space 148 is closed on the upper end by collar 150 secured by screws 152. The collar 150 has a central opening 154 dimensioned to match or slightly exceed the dimension of the molded article sought to be handled by the take-out and cooling apparatus 10.

The lower end 156 of insert 142 is also of reduced diameter except in two locations diametrically opposite each other where a single fin 144 has an extended portion 158 which acts to separate a water entry space 160 from a water exit space 162 situated between the insert lower end 156 and the sleeve 130. The two extended portions 158 cause water entering through channel 134 to follow the path indicated by the arrows in FIG. 6 upward on the left side of the insert 142 and then to proceed downward on the right side of insert 142 and out through channel 140. The insert 142 preferably has an inner diameter d which is a few hundredths of a millimeter greater in diameter than the maximum diameter of the article sought to be extracted and cooled by the apparatus.

In addition to water channels 136 and 140, the frame 80 also includes a vacuum channel 164 which is coupled to the source of vacuum 90 and to the interior of insert 142 by way of a sliding spool 166. The spool 166 is captured within sleeve 130 and has an upper end shown in FIGS. 8 and 9 which extends into insert 142. The sleeve 130 includes a pair of vertical vacuum channels 168 and horizontal stub channels 170 which couple the vacuum to a small annular space separating the lower portion of spool 166 from the interior surface of sleeve 130. The small annular space couples the vacuum to the space 172 existing between the bottom of the spool 166 and plate 80. A spring 174 biases the spool 166 upward to the position shown in FIG. 8. The spool 168 also includes vertical channels 176 running from the bottom 178 of the spool 166 to a concave dished surface 180 at the top of the spool 166. Spool 166 also includes a circular channel 182 and a pair of intersecting horizontal channels 184 terminating in circular channel 182.

Figure 8:
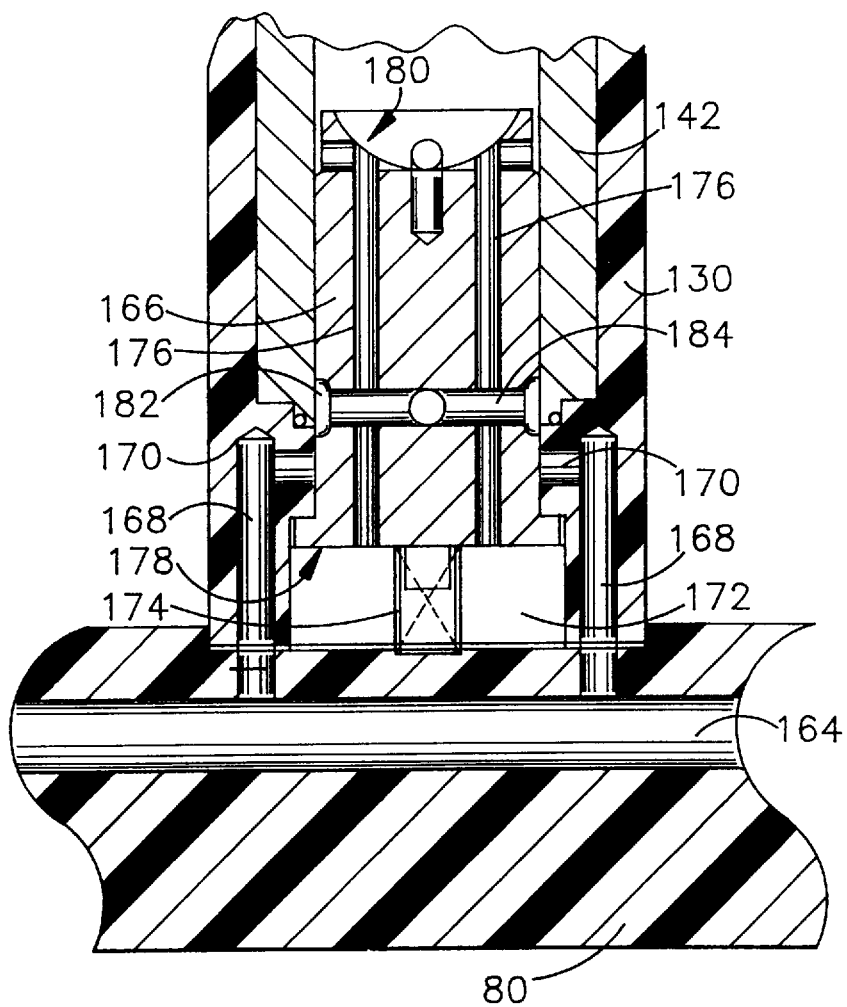
FIG. 8 is a sectional detail taken at right angles to FIG. 6 showing the spool valve in an upper most position.
Figure 9:
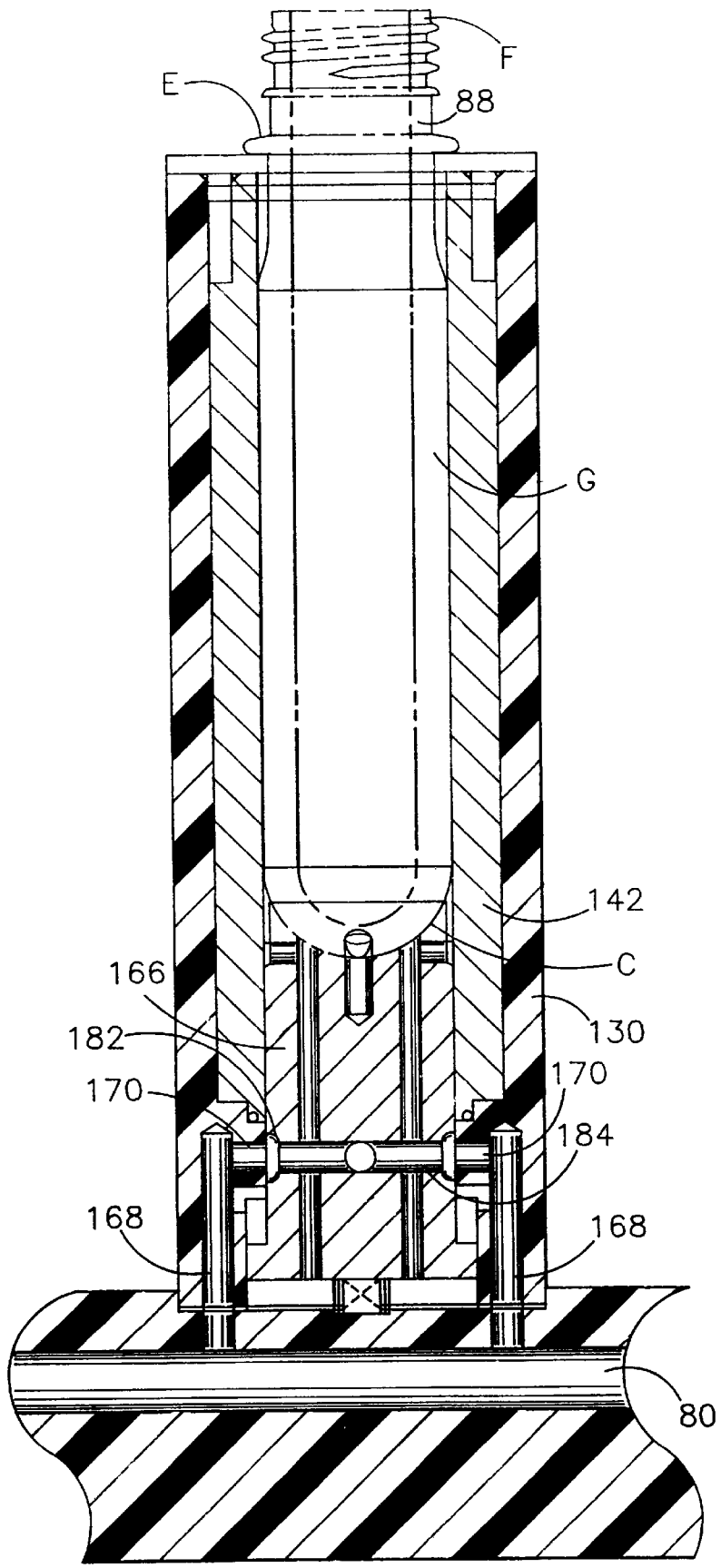
FIG. 9 is a sectional view similar to FIG. 8 with the spool valve shown in a lowered position as a result of the presence of a molded article shown in phantom.

The small dimension existing between the outer surface of spool 166 and the inner surface of sleeve 130 below channel 182 allows only a small flow of air down the interior of the insert 142 through vertical channels 176 into space 172. This throttling action of this close space insures that when the spool is situated as shown in FIG. 8 there is very little flow of air into the vacuum line 164. This small flow of air is sufficient to aid in the capture of articles from the molding machine 12 when the molded article engagement apparatus 36 is in space 19.

The molded articles 88 handled by the preferred embodiments of this invention are generally of a test tube shape having a rounded bottom C and having a support flange E separating a lower body portion G from a finish portion F intended to engage a closure. The curvature of the dish-shaped upper surface of spool 166 conforms generally to the outer surface confirmation of the bottom end C of article 88. Thus, upon insertion of article 88, the upper ends of channels 166 are obstructed thus substantially preventing the flow of any air down channels 166 into space 172. The absence of this flow of air causes the vacuum within space 172 to increase which, in turn, causes a downward pressure on the spool 166 by the air pressure acting on the interior of article 88. This differential in air pressure overcomes the biasing force of spring 174 thus causing a downward movement of spool 166 from the position shown in FIG. 8 to the position shown in FIG. 9. This downward movement of the spool 166 couples the horizontal channels 170 in sleeve 130 with the circular channel 182 and horizontal intersecting channels 184 which effectively latches the spool 166 in the downward position and maintains a hard vacuum hold on molded article 88 until the article is forcibly removed.

The removal of articles 88 from the individual article holders 28 in both the article engagement frame 36 and in the cooling frame 46 is achieved by means of the article grabbers forming a portion of the article transfer assembly 40. The details of construction of the article transfer assembly 40 are disclosed in U.S. patent application Ser. No. 08/359,037 filed Dec. 19, 1994, now pending, and form no part of the present invention.

In operation, the control 50 will receive a signal from controller 24 indicating that mold element 20 has moved to a position to define space 19 between mold element 20 and mold element 18 and is ready to release the articles molded by the machine 12. The controller 50 will then actuate motor 38 to cause carriage 34 to move in the direction X toward the molding machine 12 thus inserting the article engagement apparatus 36 to the point where the individual article receiving tubes 28 are aligned with the articles held by mold unit 20. Upon attaining that alignment, the controller 50 will instruct controller 24 to cause the molded parts to be ejected from mold 20 in such a fashion as to be inserted into the individual receiver tubes 28. Once the ejector of the molding machine 12 has completed ejection of molded articles from mold unit 20, a signal is sent from controller 24 to controller 50 which in turn actuates motor 38 to move the carriage 34 and article engaging apparatus 36 in the direction X out of space 19 and into alignment with one of the sets of the article grabbers on transfer mechanism 40.

Upon achieving the desired position, controller 50 actuates motor 44 to move gantry 42 and gripper assembly 40 toward the article engaging apparatus 36 to grab the open mouths of the molded preforms 88. Once the molded preforms have been withdrawn from the tubes 28, the controller 50 sends a ready signal to controller 24 indicating the readiness of the molded article engagement apparatus 36 to again retrieve a fresh set of molded preforms from the molding machine.

As the motor 44 is moving the gantry 42 in the direction Z along the base 30 of the take-out and cooling apparatus 12, motor 98 is actuated to rotate plate 40 until the plate 40 moves from the vertical attitude to a horizontal attitude. The motor 44 is stopped so the preforms 88 held by the article transfer plate 40 are aligned with an open set of cooling tubes in one of the cooling stations 46. The plate 40 is then caused to move downward to insert the preforms 88 into the individual cooling tubes of the selected cooling station 46. At the lowermost position, the article grabbers on plate 40 release the set of preforms into the cooling tubes. At the same time, the article grabbers grab an existing cold set of preforms.

Article transfer plate 40 is then moved vertically a distance sufficient to withdraw the cold preforms from the cooling station 46. Motor 44 is then actuated to displace the gantry 42 in the direction Z to a position where the cold preforms can be released onto belt 48. Following the release of the cold preforms, motor 98 is then actuated to rotate the plate 40 from the horizontal attitude to the vertical attitude where the grabbers are ready to grab the next set of hot preforms from the article engagement apparatus 36 which has already entered and withdrawn from the molding machine 12. The coordination of the various motor actuations is achieved by control 50 with appropriate sensors and transducers as would be apparent to those skilled in the art.

Although the invention has been described in detail with reference to the illustrated preferred embodiment, variations and modifications exist within the scope and spirit of the invention as described and as defined in the following claims.

What is claimed is:

1. A cooling assembly for cooling a molded article having an outer surface of substantially fixed geometry, the cooling assembly comprising:

a base and at least one body fixed to the base, the body having an inner surface, an insert situated within each body inner surface, each insert having an inner surface defining a cooling chamber for receiving a molded article, each insert having an outer surface confronting a corresponding body inner surface to define a volume for receiving fluid coolant, and at least one connection between said volume and a source of fluid coolant for filling the volume with the fluid coolant, the insert including at least one movable portion having a biasing means, the movable portion movable between a first position defining a first cooling chamber size and a second position defining a second cooling chamber size larger than the first cooling chamber size, whereby the insert is disposed in conforming contact with said molded article outer surface to enhance heat transfer between the molded article and the fluid coolant across the insert when the movable portion is disposed in the second position, the biasing means biasing the movable portion to return to the first position upon removal of the molded article from the insert.

2. The cooling assembly of claim 1 wherein said at least one connection comprises channels in said base connected to said volume and said source of fluid coolant for supplying fluid coolant between each insert outer surface and the corresponding confronting body inner surface.

3. The cooling assembly of claim 1 wherein each body comprises a sleeve enveloping one of the inserts, the insert outer surface defining within the sleeve a fluid coolant path coupled to the source of fluid coolant.

4. The cooling assembly of claim 1 wherein said insert inner surface is larger than the molded plastic article outer surface in at least one dimension.

5. The cooling assembly of claim 1 wherein said insert inner surface is smaller than the molded plastic article outer surface in at least one dimension.

6. The cooling assembly of claim 1 wherein each body comprises a sleeve enveloping one of the inserts, the sleeve including an open end permitting insertion of the molded article within the insert.

7. The cooling assembly of claim 6 wherein said at least one movable portion comprises a spool situated within the sleeve, the spool being movable upon contact by a surface of the molded article from the first position to the second position to vary a dimension of the cooling chamber, and the biasing means includes a biasing element biasing the spool toward the first position.

8. The cooling assembly of claim 1 further comprising a path coupled to each said insert inner surface and to a source of vacuum for insuring engagement between the molded article and the insert inner surface.

9. The cooling assembly of claim 8 wherein said path comprises at least one channels in said base connected to said cooling chamber and to and said source of vacuum for providing a region of lowered air pressure within each insert.

10. The cooling assembly of claim 8 wherein said body comprises a sleeve fixed to the base and further comprising a spool situated within each sleeve having an outer surface defining within the sleeve a restricted path coupled to the source of vacuum, the spool being movable upon contact by a surface of the molded hollow plastic article from the first position restricting the vacuum access to the second position enhancing the vacuum access, and the biasing means includes a biasing element biasing the spool toward the first position so that vacuum access is restricted in the absence of a molded hollow plastic article within the insert.

11. The cooling assembly of claim 1 wherein each said insert comprises an elastic member dimensionally responsive to changes in pressure in said volume of fluid coolant.

12. The cooling assembly of claim 11 further comprising pressure control means for controlling the pressure in said volume of fluid coolant.

13. The cooling assembly of claim 11 further comprising a path coupled to each said insert inner surface at an axial lowermost point and to a source of vacuum for insuring engagement between the molded article and the insert inner surface.

14. The cooling assembly of claim 1 wherein said body comprises a low heat transfer material insulating the coolant from the general environment while focusing the coolant toward the insert and plastic article therein.

15. A cooling assembly for use in receiving molded plastic articles having an outer surface of substantially fixed geometry from an injection molding machine comprising an frame unit including connections to a source of fluid coolant and to a source of vacuum, at plurality of sleeves fixed to the frame unit, the number and position of sleeves being equal to the number of the hollow plastic articles which are released at one time by the molding machine, an insert, situated within each sleeve, the insert having an inner surface defining a cooling chamber for receiving a molded article, each insert having an outer surface confronting a corresponding body inner surface to define a volume for receiving fluid coolant, and at least one connection between said volume and a source of fluid coolant for filling the volume with the fluid coolant, the insert including at least one movable portion having a biasing means, the movable portion movable between a first position defining a first cooling chamber size and a second position defining a second cooling chamber size larger than the first cooling chamber size, whereby the insert is disposed in conforming contact with said molded article outer surface to enhance heat transfer between the molded article and the fluid coolant across the insert when the movable portion is disposed in the second position, the biasing means biasing the movable portion to return to the first position upon removal of the molded article from the insert.

16. The cooling assembly of claim 15 wherein the insert interior surface is slightly larger in diameter and slightly smaller in length than the molded article outer surface, the insert including an open end permitting insertion of one of the molded articles within the insert, and further comprises a spool situated within each sleeve having an outer surface defining within the sleeve a restricted path coupled to the source of vacuum, the spool being movable upon contact by a surface of one of the set of preforms from the first position restricting the vacuum access to the second position enhancing the vacuum access, and wherein the biasing means includes a biasing element biasing the spool toward the first position so that vacuum access is restricted in the absence of a preform within the insert.

17. The cooling assembly of claim 15 wherein said insert comprises an elastic member dimensionally responsive to changes in pressure in said volume of fluid coolant, said assembly further comprising pressure control means for controlling the pressure in said volume of fluid coolant to facilitate introduction and withdrawal of the molded article, and a path coupled to each said insert inner surface at an axial lowermost point and to a source of vacuum for insuring engagement between the molded article and the insert inner surface once the molded article is fully introduced into the cooling assembly.

18. A storage receiver coupled adjacent to a molding machine for cooling molded articles manufactured in sets by the molding machine, the molded articles having an outer surface of substantially fixed geometry, the storage receiver comprising a base, a body coupled to the base including at least two sets of cooling chambers for cooling the molded plastic articles while they are being stored by the storage receiver, each set of cooling chambers being equal in number to the number of plastic articles released at one time by the injection molding machine, each cooling chamber comprising a body inner surface, an insert situated within each body inner surface, each insert having an insert inner surface defining a cooling chamber for receiving a molded article, each insert having an outer surface confronting a corresponding body inner surface to define a volume for receiving fluid coolant, and at least one connection between said volume and a source of fluid coolant for filling the volume with the fluid coolant, the insert including at least one movable portion having a biasing means, the movable portion movable between a first position defining a first cooling chamber size and a second position defining a second cooling chamber size larger than the first cooling chamber size, whereby the insert is disposed in conforming contact with said molded article outer surface to enhance heat transfer between the molded article and the fluid coolant across the insert when the movable portion is disposed in the second position, the biasing means biasing the movable portion to return to the first position upon removal of the molded article from the insert.

19. The storage receiver of claim 18 wherein said at least one connection comprises channels in said base connected to said volume and said source of fluid coolant for supplying fluid coolant between each insert outer surface and the corresponding confronting body inner surface.

20. The storage receiver of claim 18 wherein said insert inner surface is larger than the molded plastic article outer surface in at least one dimension, and said insert inner surface is smaller than the molded plastic article outer surface in at least one other dimension.

21. The storage receiver of claim 18 wherein each insert comprises an elastic member dimensionally responsive to changes in pressure in said volume of fluid coolant, and a path coupled to each said insert inner surface at an axial lowermost point and to a source of vacuum for insuring engagement between the molded article and the insert inner surface.

22. The cooling assembly of claim 21 further comprising pressure control means for controlling the pressure in said volume of fluid coolant.

23. A cooling assembly for cooling a molded article having an outer surface of known geometry, the cooling assembly comprising:

a base including connections to a source of fluid coolant and to a source of vacuum, at least one sleeve fixed to the base, an insert, situated within each sleeve, the insert having an outer surface defining within the sleeve a fluid coolant path coupled to the source of fluid coolant, the insert having an interior surface matching, but slightly larger than, a portion of the molded article outer surface, and an open end permitting insertion of the molded article within the insert, a spool situated within each sleeve having an outer surface defining within the sleeve a restricted path coupled to the source of vacuum, the spool being movable upon contact by a surface of the molded article from a first position restricting the vacuum access to a second position enhancing the vacuum access so that the spool and the interior surface of the insert are disposed in conforming contact with the molded article outer surface to enhance heat transfer between the molded article and fluid coolant across the insert and the spool when the spool is disposed in the second position, and a biasing element biasing the spool toward the first position so that vacuum access is restricted in the absence of a molded article within the insert.

24. The cooling assembly of claim 23 wherein the insert has a thermal conductivity significantly greater than the sleeve to localize the cooling effects of the assembly to the interior of the insert.

25. The cooling assembly of claim 23 wherein the insert outer surface comprises a plurality of fins in the fluid coolant path for enhancing the cooling capacity of the insert.

26. The cooling assembly of claim 25 wherein at least one of the fins is elongated for the purpose of separating an in-flowing stream of fluid coolant from and out-flowing stream of fluid coolant.

27. The cooling assembly of claim 23 wherein the spool is situated adjacent the base and includes a surface for contact by an end of the molded article.

28. The cooling assembly of claim 27 wherein the spool includes at least one pathway coupling the vacuum source path to the molded article end contacting surface.

29. The cooling assembly of claim 23 further comprising an end cap fixed to the sleeve and retaining the insert within the sleeve, the end cap including an opening having a shape similar to the insert open end permitting insertion of the molded article within the insert, the end cap having an interior surface defining a portion of the fluid coolant path.

30. A cooling assembly for cooling a molded article having an outer surface of substantially fixed geometry, the cooling assembly comprising:

a base including connections to a source of fluid coolant, at least one sleeve having an inner surface fixed to the base, an elastic insert, situated within each sleeve, each insert having an inner surface and an outer surface, the outer surface of each elastic insert and corresponding sleeve inner surface defining a volume filled by the fluid coolant, the elastic insert inner surface capable of conforming contact with the molded article outer surface to effect heat transfer between the molded article and the fluid coolant across the elastic insert.

31. The cooling assembly of claim 30 wherein the insert has a thermal conductivity significantly greater than the sleeve to localize the cooling effects of the assembly to the interior of the insert.

32. The cooling assembly of claim 30 further comprising an end cap fixed to the sleeve and retaining the insert within the sleeve, the end cap including an opening having a shape similar to the insert open end permitting insertion of the molded article within the insert.

33. The cooling assembly of claim 30 wherein each said insert comprises an elastic member dimensionally responsive to changes in pressure in said volume of fluid coolant.

34. The cooling assembly of claim 30 further comprising pressure control means for controlling the pressure in said volume of fluid coolant.

35. The cooling assembly of claim 30 further comprising a path coupled to each said insert inner surface at an axial lowermost point and to a source of vacuum for insuring engagement between the molded article and the insert inner surface.

36. The cooling assembly of claim 30 wherein said body comprises a low heat transfer material insulating the coolant from the general environment while focusing the coolant toward the insert and plastic article therein.

* * * * *